United States Patent [19]

Chen

[11] Patent Number: 5,087,205

[45] Date of Patent: Feb. 11, 1992

[54] ADJUSTABLE INTERACTIVE AUDIO TRAINING SYSTEM

[76] Inventor: Abraham Y. Chen, 2035 Tripiano Ct., Mountain View, Calif. 94040

[21] Appl. No.: 489,860

[22] Filed: Mar. 5, 1990

Related U.S. Application Data

[63] Continuation of Ser. No. 235,473, Aug. 24, 1988, abandoned.

[51] Int. Cl.⁵ ............................................. G09B 5/04
[52] U.S. Cl. ................................................... 434/320
[58] Field of Search ........................ 434/319, 320, 321

[56] References Cited

U.S. PATENT DOCUMENTS

| | | | |
|---|---|---|---|
| 3,405,461 | 10/1968 | Joslow | 434/320 |
| 3,550,289 | 12/1970 | Orita et al. | 434/320 |
| 3,641,507 | 2/1972 | Kosaka et al. | 434/320 |
| 3,662,121 | 5/1972 | Cruger | 434/320 |
| 3,747,228 | 7/1973 | Yamamoto | 434/320 |
| 3,777,417 | 12/1973 | MacNeill et al. | 434/320 |
| 3,905,128 | 9/1975 | Koizumi et al. | 434/321 |
| 4,172,329 | 10/1979 | Chen | 434/319 |
| 4,539,436 | 9/1985 | Theis | 379/72 |
| 4,692,817 | 9/1987 | Theis | 379/80 |
| 4,747,125 | 5/1988 | Buchberger et al. | 434/321 |

Primary Examiner—William H. Grieb

[57] ABSTRACT

A commercial, two deck, stereo tape system, FIGS. 2 and 3, by means of the system control and switching logic module of FIG. 4 and the manual controls of FIG. 5, is adapted to provide an adjustable, interactive audio training system. A three position switch 503 permits an operator to select from three modes of system operation, namely, normal tape mode, master tape mode and training mode.

When the system is in the normal tape mode, the switches of FIG. 3 are in full control. The system can be used exactly the same way as the original two deck stereo tape system.

When the system is in the master tape mode, the system control and switching logic module of FIG. 4, in response to signals from manual controls of FIG. 5, permits an instructor to prepare "Master" tapes which may comprise: lecture material as a preamble to a training exercise; one or more series of "cues" to which a trainee is to respond; and discretely coded control signals.

When the system is in the training mode, the control module, in response to control signals read from a master tape and to trainee voice activity, generates strings of control signals for the tape module of FIG. 2 to automatically sequence presentation of the lesson material without disconcerting demands on a trainee.

6 Claims, 9 Drawing Sheets

Fig. 6

LEGEND:
///// BLANK
||||| TONE #1    (CHPD CUE TONE)
..... TONE #2    (PERIODICAL BEEP TONE)
---- TONE #3    (CONTINUOUS TONE)

Fig. 7

ADJUSTABLE INTERACTIVE AUDIO TRAINING SYSTEM

This application is a continuation of application Ser. No. 235,473, filed Aug. 24, 1988, now abandoned.

TECHNICAL FIELD

This invention relates to an improved interactive audio system for the training of individuals.

BACKGROUND OF THE INVENTION

An interactive working session is an effective way to train, learn, memorize, rehearse, and/or prepare for testing of verbal material. Such sessions and the attendant process are generally termed role playing. Although the use of a human as an instructor or trainer on a one to one basis in role playing sessions may be effective, such arrangements are neither efficient nor cost effective. Training systems which employ audio recorders to conduct role playing sessions have been devised in an effort to improve efficiency of instructor time and to reduce cost of role playing sessions.

Prior art tape training systems individually provide many of the basic functions provided by applicant's invention; however, they generally do not provide for generation of master tapes and the conduct of training sessions on the same machine.

Furthermore, prior art systems either require manual operations to intersperse responses with training material; or they provide for fixed response periods which are artificially long or which correspond to the length of the individual training statements. An example of a system of the former type is found in U.S. Pat. No. 3,662,121 which as issued on May 9, 1972. This patent describes a method to switch from one role to the other during training. However, switching back to the original role to continue on the training session requires manual intervention. This significantly distracts the trainee's attention from the training material. An example of a system of the latter type is found in U.S. Pat. No. 4,172,329 which was issued on Oct. 30, 1979. The arrangements found in this patent may be satisfactory for training sessions in which the trainee merely mimics the words of the trainer e.g., in sessions for the learning of languages.

Neither system has considered the essential ingredient of an interactive training session, that is, the timing element. Often the reaction time of the trainee need be as short as possible and where the length of the trainee's response is unrelated to the length of the trainer's "cue", i.e., the trainer's questions or challenging statements, the trainee's response may be shorter or much longer than the cue. Accordingly, the provision of an equal amount of time for response is not proper in most applications; and the provision of uniform length long periods for response tends to waste training time and to create an unnatural tempo in the exchange of cues and the responses of the trainee.

The response times of interest to this invention are the "react time" i.e., the permissible lengths of times between the end of a "cue" and the beginning of the trainee's corresponding response; and the "pause time" i.e., the permissible length of pauses in the trainee's response once a response has been started.

Without provisions for selectively defining these times of interest, it is not possible to adapt the training session material to different levels of trainee proficiency.

Additionally, prior art interactive training systems provide no security against the use of training tapes of one training organization by a competing organization.

DISCLOSURE OF THE INVENTION

In accordance with the present invention, an interactive audio training system comprises: a two deck, stereo, recording playback tape module; manual control switches for selecting among available modes of system operation and for generating request signals to initiate functions applicable to the selected mode of operation; and a system control module that, in response to the request signals and to voice activity, generates and transmits strings of command signals to the tape module to implement the requested functions without further user intervention.

In accordance with a further aspect of the invention, the system further comprises: master training media e.g., magnetic tapes containing training material and discretely coded control signals; playback means in the tape module which read the training media to produce audio output signals and corresponding system control signals; and the system control module *which* employs the control signals read from the master tape in the generation of certain of the strings of command signals.

Advantageously, since the creation of master tapes and the training sessions are carried out in a single integrated unit, master tapes for different customers can carry differently coded control signals to prevent tapes generated for one customer to be used by a competing customer.

In accordance with another aspect of this invention, the system comprises arrangements for selectively defining acceptable limits of the time periods for trainee responses to training "cues" in an interactive role playing session.

THE DRAWING

The invention may be readily understood by reference to the drawing in which:

FIGS. 6 and 7 illustrate the format of information on the master and trainee tapes of applicant's invention;

FIG. 10 illustrates the arrangement of FIGS. 2 through 5.

DETAILED DESCRIPTION

Figure 1:
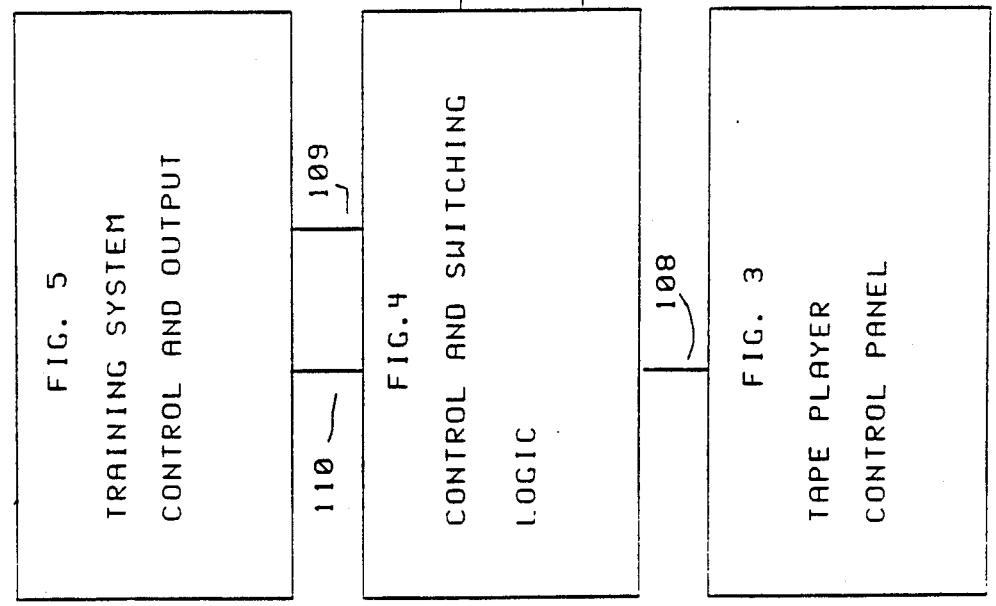
FIG. 1 is a block diagram of applicant's invention.

The illustrative embodiment set forth in FIG. 1 utilizes a commercially available two deck, stereo tape recorder and player system. A "TEAC" model W-660R/W-460C tape system is an example of a commercially available tape system. The blocks labeled 102 and 103 in FIG. 1 respectively comprise: the tape module of the commercial tape system and manual controls for that system.

Figure 5:
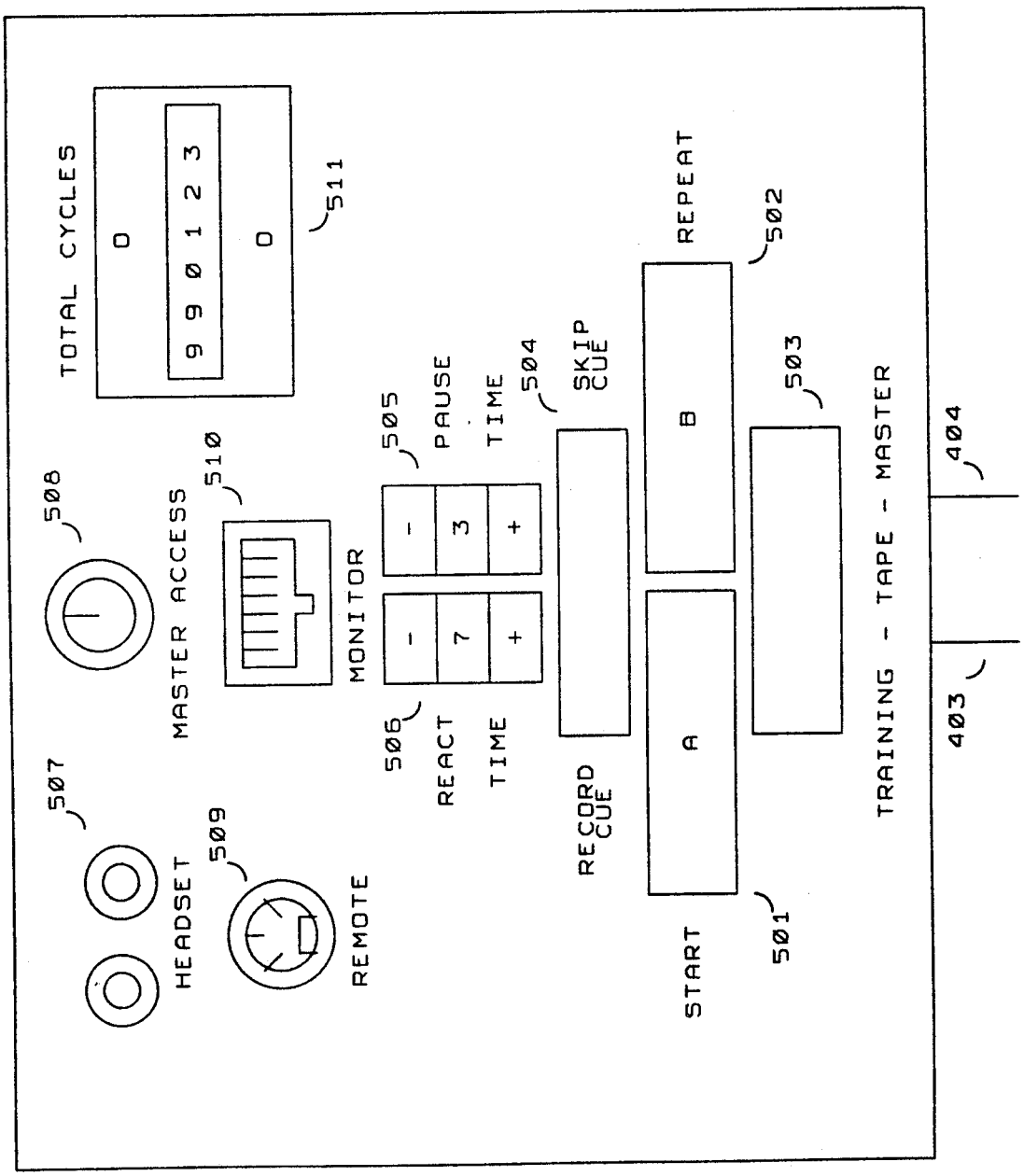
FIG. 5 illustrates control and audio input and output arrangements of applicant's invention.

FIG. 5 further comprises: manual controls for selecting among three available modes of operation of applicant's invention i.e., normal tape mode, master mode for preparation of training tapes, and training mode for conducting training sessions; Switches A and B which are employed in both the master tape mode and the training mode; the record cue or skip cue switch which is employed in the training mode; and controls 506 and 505 for selectively setting the acceptable time limits of the "react" and "pause" times which are referenced earlier herein.

The remote jack 509 allows the use of a control handle with extendable coil cable to perform the same function as the switches A and B. The monitor jack 510 provides an audio input/output channel, separate from that of the headset jack 507, to the outside. A remote speaker can be used to monitor the full training session. Along with a power feed in this jack, an amplified speaker can be used for a larger audience to monitor the training. Furthermore, a push-to-talk headset can be used by the instructor either to monitor the training without disturbing the trainee or, by activating the push-to-talk switch thereby interrupting the training session to establish two-way intercom conversation with the trainee. This is particularly useful in a classroom setting where each trainee is working individually with one of the applicant's systems. A multi-position selection switch console enables the instructor to provide private coaching to any individual trainee without disturbing others. The total cycles 511 is a counter which records the number of training repeat cycles thus providing a quantitative record of system usage for auditing and maintenance purposes.

Figure 2:
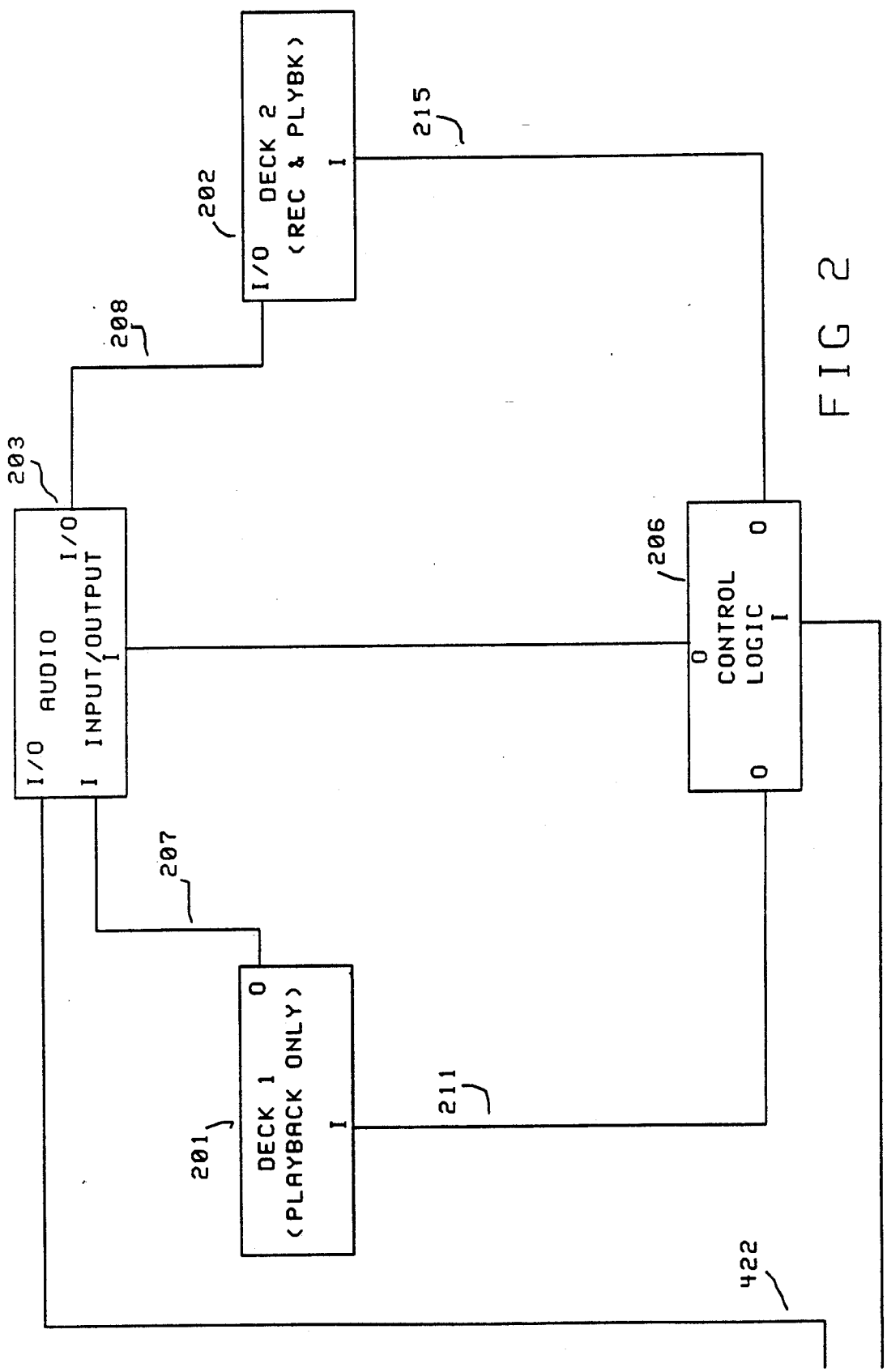
FIG. 2 is a block diagram of a two deck, stereo tape system employed in applicant's invention.

The system control and switching logic 104 of FIG. 1 comprises logic for generating strings of control signals for the tape module of FIG. 2 during the "master" and "training" modes of operation of applicant's invention. In the illustrative embodiment, the system control and switching logic circuitry 104 is implemented in discrete circuitry. However, the same logical operations and the corresponding control signals can be equally well implemented by stored program control.

NORMAL TAPE MODE

Figure 3:
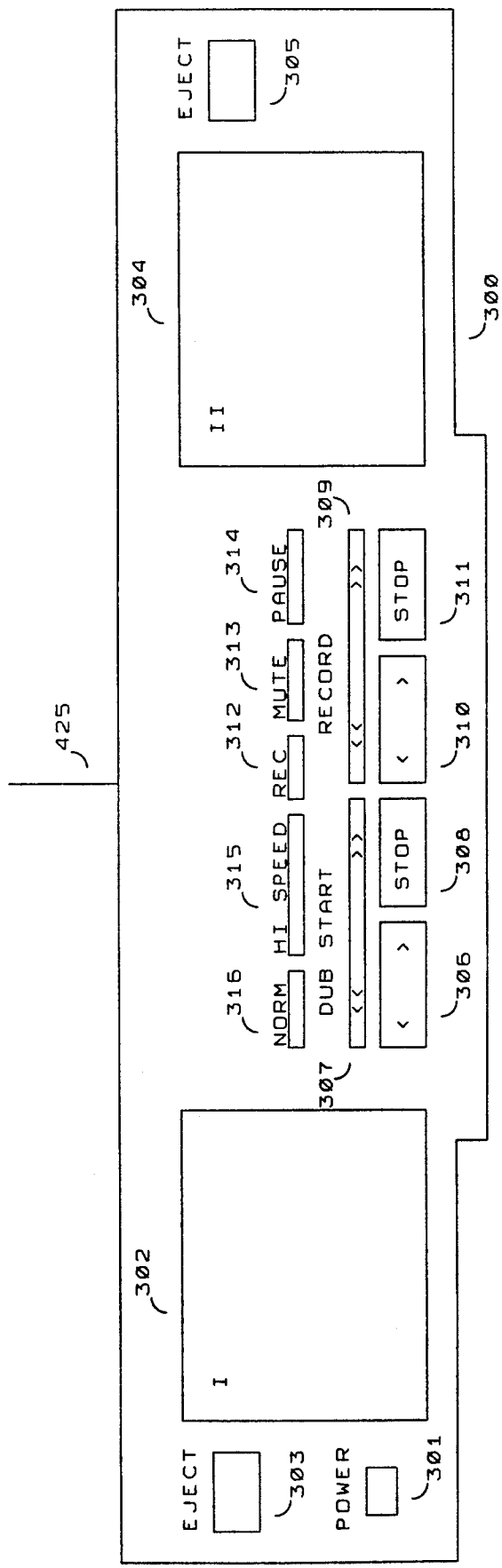
FIG. 3 illustrates controls associated with the tape system of FIG. 2.
Figure 4:
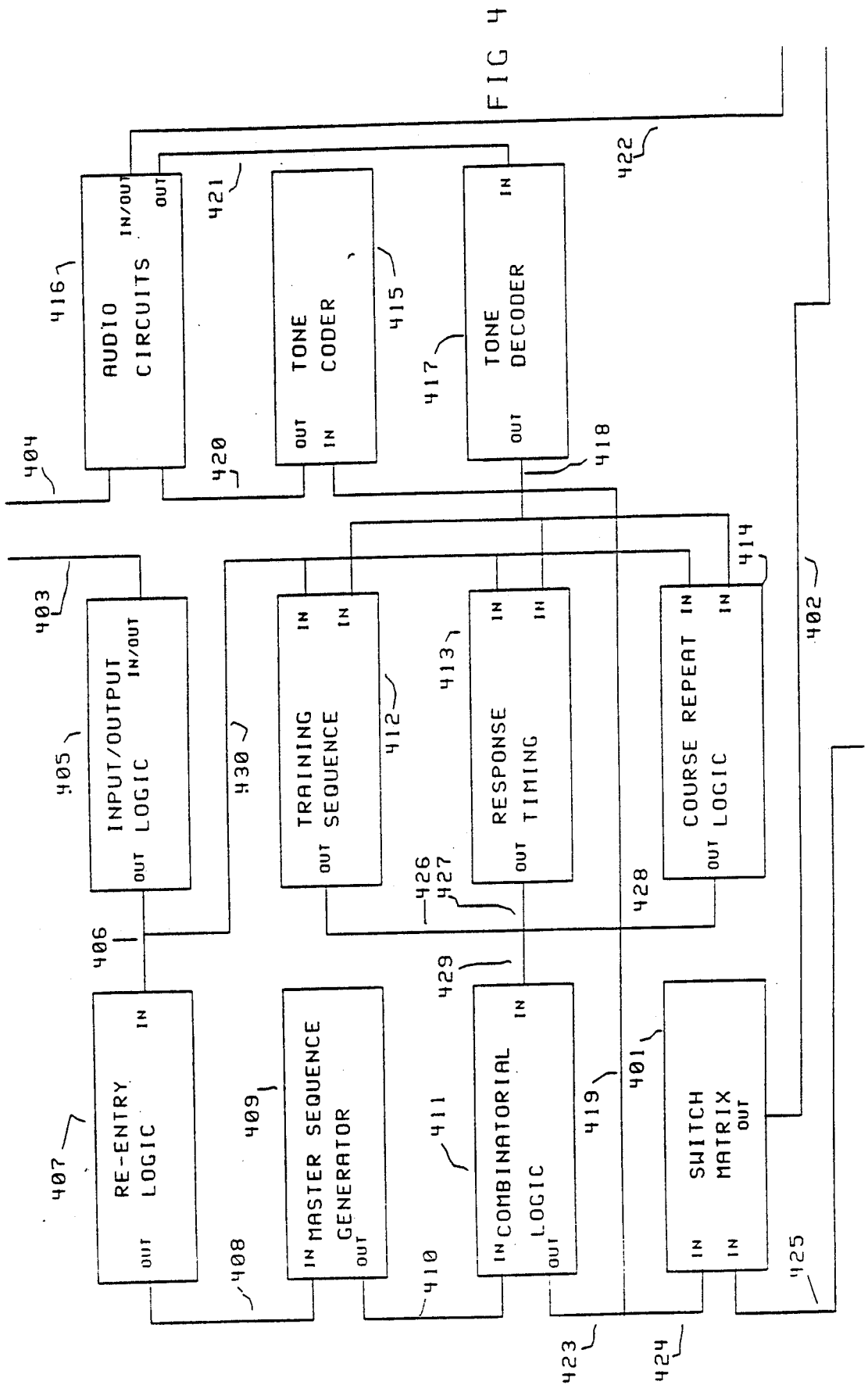
FIG. 4 is a schematic block diagram of control circuitry employed in applicant's invention.

In the normal tape mode of operation the controls of FIG. 3 are connected directly to the tape apparatus of FIG. 2 through switching matrix 401 in FIG. 4. In the master and training modes of operation, the controls of FIG. 3, except for the power switch 301 and the eject controls 303 and 305, are disabled.

The standard tape controls are illustrated as boxes in FIG. 3. The boxes labeled 302 and 304 respectively comprise the tape receptacles and transports for decks I and II; and the boxes labeled 303 and 305 respectively represent switches for ejecting tapes from the receptacles of decks I and II. The switches labeled 306 and 310 respectively control forward and reverse motion of tapes in decks I and II at normal playback speed; and switches 307 and 309 control high speed forward and reverse motion of tapes in the corresponding decks. Switches 308 and 311 are employed to stop the motion of tapes in decks I and II.

The controls for deck II further comprise a "record" switch 312 to initiate recording; a "Rec Mute" switch 313 which causes a tape in deck II to be recorded with blank for a period of approximately four seconds. These four second blank periods are detected when a tape is rewound in deck I operating in the "program search" configuration. A "pause" switch 31 allows tape motion to be temporarily stopped and started with a minimum of delay.

The standard tape system provides "dubbing" controls for copying material from a tape in Deck I to a tape in Deck II. The "Dub Norm" control 316 serves to copy material at normal playback speed; and "Dub high speed" control 315 effects the same function at a higher tape speed. The Dub high speed mode is useful for making working copies of master tapes.

FIG. 2 is a block diagram representation of a commercial tape module. Deck I is arranged for playback only operation and deck II is arranged for both record and playback operation. The audio input/output circuit 203 of FIG. 2, selectively: connects audio signals read from tapes in decks I and II to cable 422 which is connected to an input/output terminal of the audio circuit 416 in FIG. 4; connects audio output signals from audio circuit 416 to deck II for recording; and interconnects the normal tape input and output terminals, which are not shown in the drawing, to the external audio system. The circuit 203, when operated in the "dubbing" configuration effects copying of material from a tape in deck I to a tape in deck II under the control of signals from the control logic 206.

TONE TYPES AND LEGEND

Figure 7:
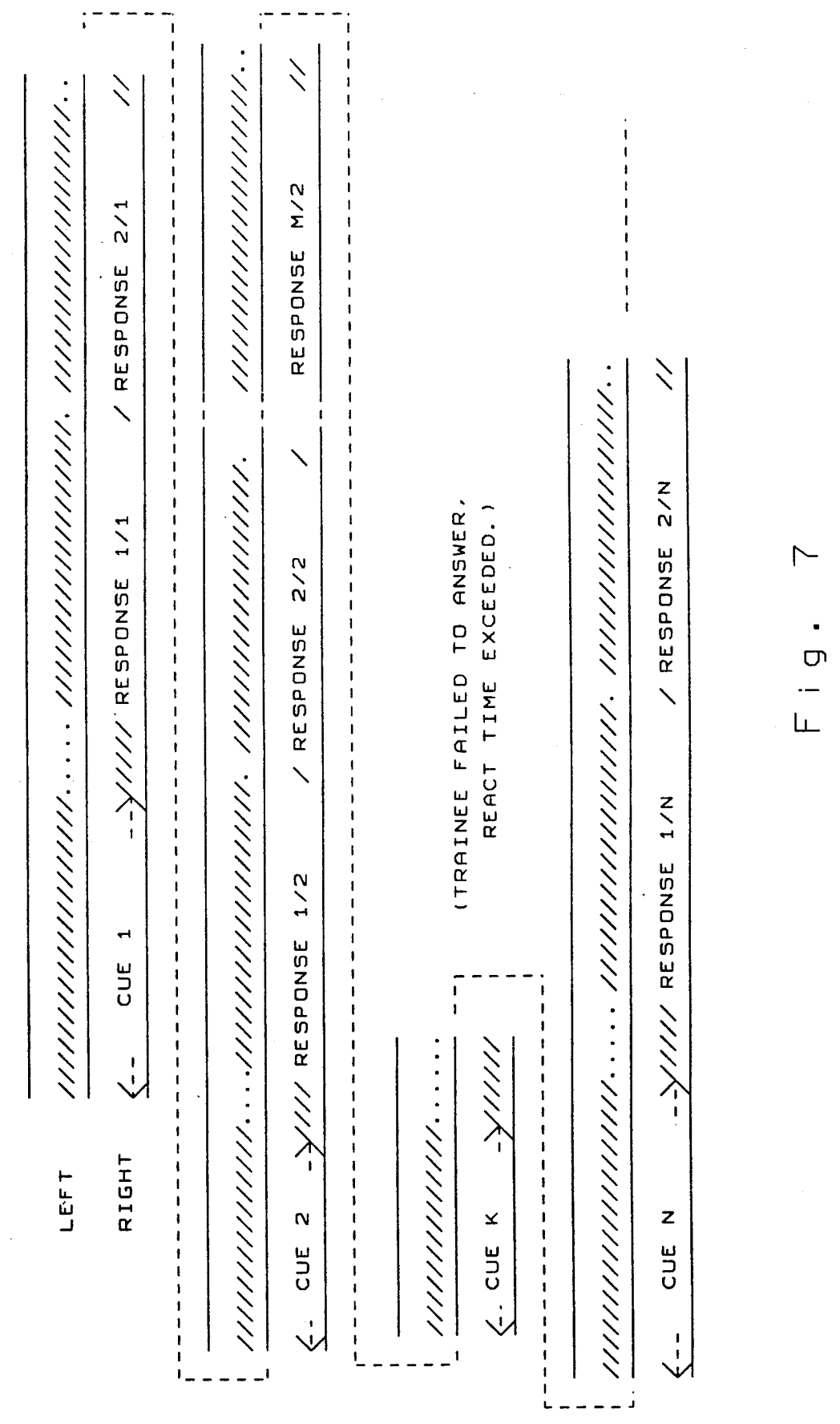

The legend at the bottom of FIG. 6 and 7 sets forth the symbols for control signals which are recorded on the tapes utilized in the applicant's system. Blank periods on the left and right channels are represented as parallel "slash" marks. Tone #1, a chopped cue tone, which can appear only on the left channel, is represented by parallel vertical marks. By way of example tone #1 may be a 1 Khz signal modulated at 16 hz. The use of different chopped cue signals in systems for different customers provides security against the use of master tapes of one client in a machine of another client.

Tone #2, a periodical beep tone, is a control signal which is recorded on the left channel after the end of a cue and before the start of a response; and is recorded on the left channel during any pauses during the trainee's response. By way of example, Tone #2 may be 0.25 second bursts of 1 Khz. tone with a set repetition rate. The maximum number of bursts that may be recorded is determined by the "react" time and "pause" time settings referenced later herein under the heading Training Mode.

Tone #3 is a continuous 1 Khz tone, which is recorded on both the left and right channels to signal the end of the tape. Tone #3 on the left channel is a control signal which serves to initiate rewinding of the training tape; and the same tone on the right signal is an audible signal which denotes the end of the tape to a trainee.

MASTER TAPE MODE

The master tape mode of operation is employed to prepare and correct master training tapes in accordance with the format shown in FIG. 6. The tape 601 of FIG. 6 comprises a left channel 602 which contains control signals and blank periods in which there is no record on the tape; and a right channel 603 which contains audio signals and fixed length blank periods in which there is no record on the tape. The fixed length blank periods comprise control signals which signify the end of either lecture material or cue material.

In the master tape mode of operation, the tape transport of deck II is toggled on and off under the control of the trainer as lecture and cue material is recorded on the tape.

The illustrative master tape of FIG. 6 contains an introductory lecture and a set of cues labeled 1 through n. A tape may contain one or more sets of cues with or without corresponding lectures.

The lecture, which may be of any desired length, is recorded on the right channel and the left channel is blank. At the end of the lecture 4 seconds of blank recording is placed on both the left and right channels. The four second blank period is a control signal which the system utilizes during a portion of the trainee mode of operation.

Each cue is recorded on the right channel along with tone #1 on the left channel. The start of the recording of the cue is delayed 0.5 second beyond the start of the record of tone #1. This delay permits the system control to recognize the beginning of tone #1 and prepare for transfer of the associated cue to the trainee tape during the training mode.

At the end of each cue, tone #1 and cue signals are cut off for 0.5 second to create 0.5 second blank periods on both channels. These blank periods on the left channel are utilized to control the system logic during the training mode of operation. The recording of cue #2 and subsequent cues follows the same recording pattern as set forth above with respect to cue #1.

When the trainer signifies the end of the last cue, a 4 second recording of tone #3 is recorded on both channels.

Figure 8:
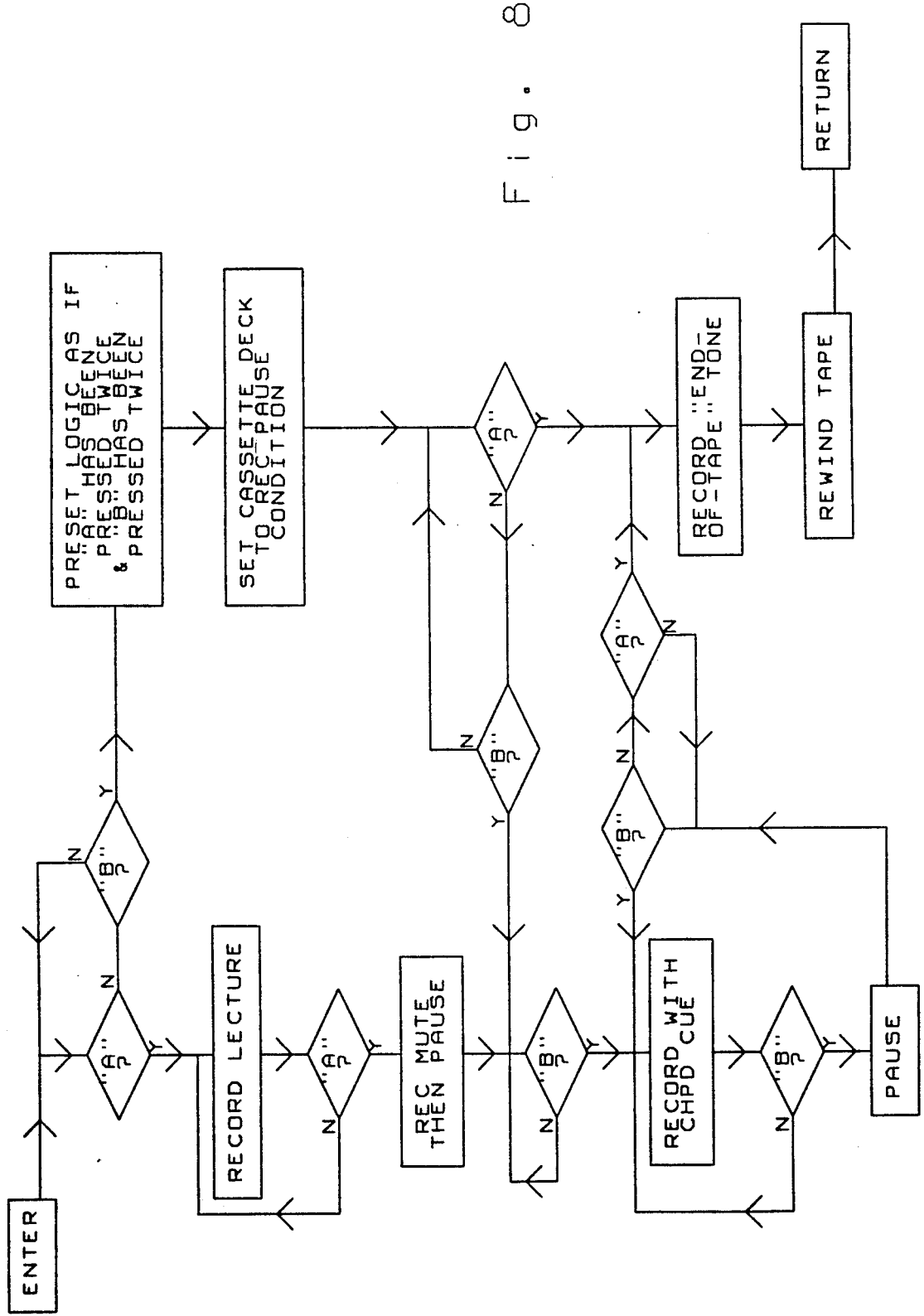
FIGS. 8 and 9 are flow charts which demonstrate operation of the system in the master and training modes of operation respectively.

The generation of a master tape in accordance with the format of FIG. 6 can be understood from the following description of the flow chart of FIG. 8 and the system apparatus.

A trainer initiates a master tape session by unlocking the master access lock 508 with a key and by operating switch 503 to the master tape mode. The master tape cannot be generated without operation of lock 508. The trainer utilizes the A switch 501 and the B switch 502 in the course of recording a lecture and a set of cues as set forth below.

The protocol for generating a master tapes prescribes that the trainer will: depress the A switch 501 to initiate recording of lecture material; record the lecture material; and again depress the A switch 501 to prepare for the recording of cues. The functions performed by recognition of the depression of the A switch 501 are shown in the left path in FIG. 8. The right path in FIG. 8 is employed when the B switch 502 is depressed without first depressing the A switch 501. This protocol, which is described later herein, is for the "re-entry" process which is employed to correct cue statements and to record special instructions in the lecture format, just before recording the end of the tape tone.

As seen in FIG. 8, the first recognition of depression of the A switch initiates recording.

Signals from the A switch 501 are transmitted to the input/output logic 405 of FIG. 4 over the signal path 403. The input/output logic circuit serves to condition signals which are exchanged between FIG. 3 and FIG. 4. The output of the logic circuit 405 is connected to the re-entry logic 407 over path 406. For the purpose of the present discussion it is assumed that the trainer has followed the prescribed protocol and has first operated the A switch 501. With that assumption, the re-entry logic 407 passes an "A switch operated" signal to the master sequence generator 409. The master sequence generator in turn, generates a control signal to the combinatorial logic 411. The function of the master sequence generator and the combinatorial logic 411 is to generate strings of command signals for the tape system of FIG. 2 and to control various functions within FIG. 4. The output signals of combinatorial logic 411 are transmitted to the tape system of FIG. 2 via paths 423 and 424, switch matrix 401 and path 402. When the system is operated in other than the normal tape mode, the switch matrix connects the output conductors of the combinatorial logic to the control logic 206 of FIG. 2. The signals to the control logic 206 correspond to the control signals which may be generated by the controls of FIG. 3 when the system is operated in the normal tape mode. Accordingly, upon recognition of the first depression of switch A, a record signal is transmitted to control logic 206.

The trainer records the lecture material and, upon completion, depresses switch A. As seen in FIG. 8, recognition of the second depression of switch A mutes recording to put a four second blank on both channels and then put the transport to the record pause mode. As seen from FIG. 3, the record mute and pause functions are normal functions of the commercial tape player system. To implement these two functions, the system control logic of FIG. 4, by means of the master sequence generator and the combinatorial logic 411 transmits the corresponding control signals to the tape system control logic 206. After recording the four second blank, the motion of the tape is paused until the trainer proceeds to record the first cue statement.

The protocol for recording a cue requires the trainer to depress the B switch 502 to initiate recording. The output signal generated by depression of the B switch 502 is transmitted to the input/output logic 405 over the path 403. An output signal of the logic 405 generates and transmits a signal to the master sequence generator circuit 409 to initiate the functions associated with the recording of a cue. As seen from the tape format of FIG. 6 and the flow chart of FIG. 8, recording is enabled to permit a cue to be recorded on the right channel of the tape in deck II and tone #1 is recorded on the left channel. The recording of cues is enabled 0.5 sec. after the recording of Tone #1 is started. The trainer proceeds to record the first cue statement and again depresses switch B to signify the end of the first cue. As seen from FIGS. 6 and 8, when the system logic of FIG. 4 recognizes the second depression of Switch B, a 0.5 second blank is recorded on the tape and then the tape transport is stopped in the pause mode.

The trainer may proceed to record further cue statements by depressing switch B at the beginning and end of each cue. After the last cue is recorded, the trainer may depress switch A to initiate an end of tape sequence. As shown in FIG. 6, the end of tape sequence serves to record Tone #3 on both channels of the tape for a period of four seconds. This tone on the right channel is an audible signal to a trainee which indicates the end of the lesson. The same tone on the left channel is a control signal to automatically initiate rewinding of the tape. The implementation of the end of tape sequence is shown in FIG. 8. Upon recognition of the depression of Switch A, after depression of switch B, the master sequence generator 409, generates signals to: enable tone coder 417 to generate tone #3 on conductor 420; and to set the tape system of FIG. 2 to the record mode. The four seconds of Tone #3 are recorded on both channels and the tape transport is set to rewind to its beginning.

The master tape may be removed from the transport of Deck II and placed in the transport of deck I in preparation for copying the contents of the master tape to one or more working master tapes. The system is placed in the normal tape mode; the master tape to be copied is placed in the transport of Deck I; a blank tape is placed in the transport of Deck II; and the "dub high speed " switch is depressed. This process may be repeated to generate a plurality of working master tapes.

The training system in accordance with the present invention provides a re-entry protocol for correction of cue recordings during the preparation of a master tape. When the trainer recognizes that an error was made in the last entered cue statement, the three position switch 503 is moved to the normal tape mode. This serves to reset the system logic and stop motion of the tape transport. The tape, by means of the normal tape system controls, is manually moved to the beginning of the text to be corrected. The trainer returns the three position switch 503 to the master tape mode. The re-entry protocol requires that the B switch 502 be depressed to initiate the correction process. As seen from FIG. 8, if the B switch is operated before the A switch, the right flow path of FIG. 8 is followed. The re-entry logic 407 maintains a record of the order of depressions of the A and B switches. In the event that the B switch is depressed without prior depression of the A switch, the system control logic sets the tape player of FIG. 2 to the "record and pause" state. Then, in the event that the A switch is depressed without again depressing the B switch, the system logic will initiate the end of tape sequence which is described earlier herein.

The protocol for correcting a master tape prescribes depression of switch B again; recording of the correct cue material and subsequent depression of switch B. The implementation of the re-entry protocol with the apparatus of FIG. 4 proceeds as set forth in the flow chart of FIG. 8. After correction of the last recorded cue, the trainer proceeds to record additional cue statements or initiates the end of tape sequence by depressing switch A.

TRAINING MODE

At the beginning of a training session, a copy of the master tape is placed in the transport of Deck I; a blank trainee tape is placed in the transport of deck II; and the three position switch 503 is moved to the training mode position. Before proceeding further, the trainee operates switch 504 to either the record cue position or to the skip cue position. When the switch is placed in the record cue position, the cues are recorded on the trainee tape along with the trainee's responses. When the switch is placed in the skip cue position, only the trainee's responses are recorded on the training tape. At this point in the training process, the trainer sets switches 506 and 505 to establish the "react time" and "pause time" time periods. It is contemplated that as the trainee progresses in his performance, these settings will be reduced to target values which are established by the trainer.

Figure 9:
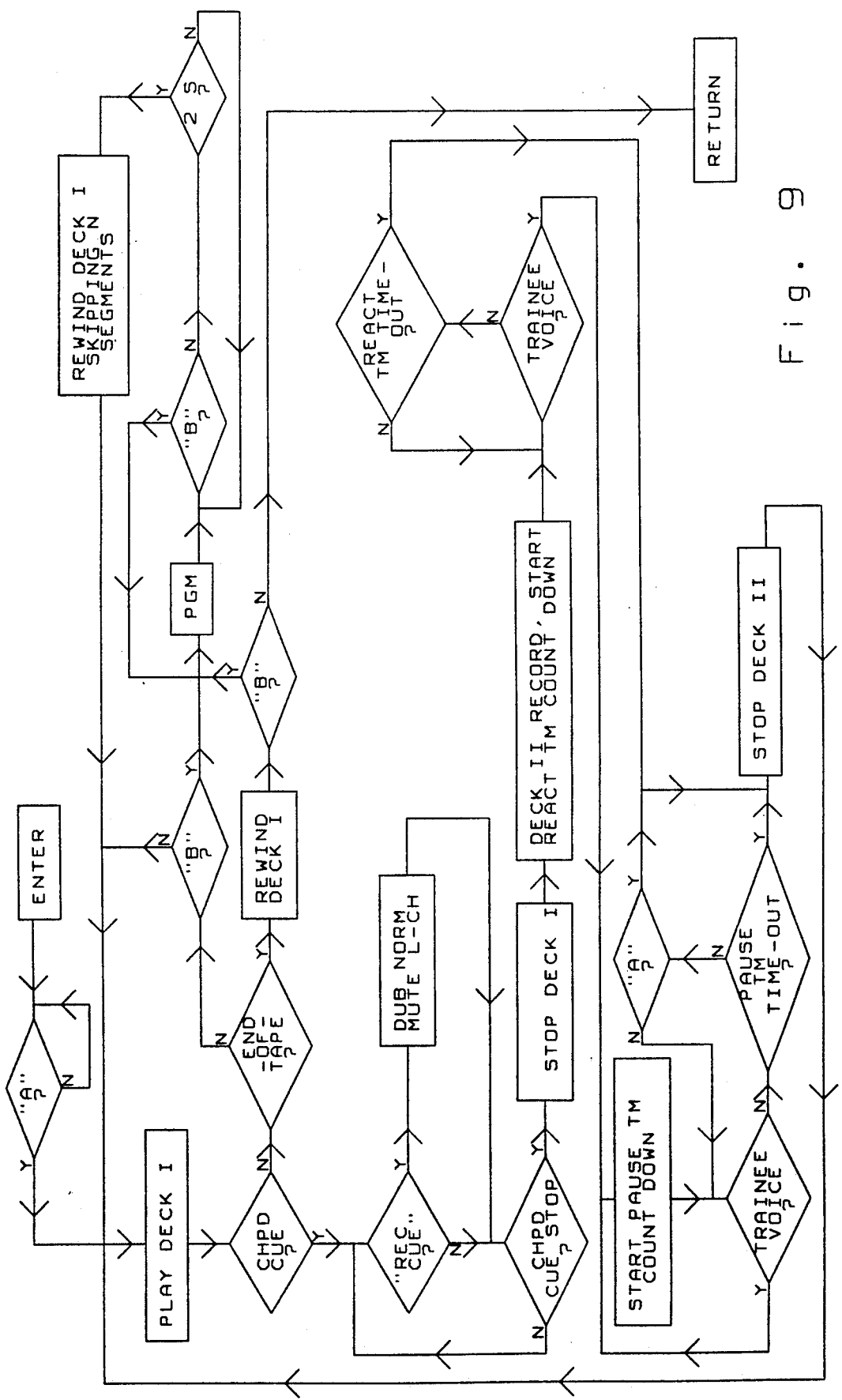

The format of the trainee tape, in which the "record cue" option is elected, is set forth in FIG. 7 and the flow chart showing the operation of the system is shown in FIG. 9. The legend for the recordings on the trainee tape are the same as the legends employed in FIG. 6. As seen in FIG. 7, the right channel contains: cue statements; trainee responses and blank periods; and the left channel is blank during the cue statements and responses on the right channel and contains tone #2 during blank period on the right channel.

The protocol for a training session requires the trainee to depress the A switch 501 to listen to the lecture and then to respond to the cue statements as they are presented. No other action is required of the trainee since the session proceeds without interruption until the end of the tape is reached. Accordingly, the session proceeds without any diversion of the trainees attention.

As seen in FIG. 9, when the depression of the A switch is detected, an instruction to play deck I is generated. With respect to the circuitry of FIG. 4, the input/output logic 405 electrically conditions the A switch signal from the switch 501 and passes the conditioned signal to the input of the training sequence generator 412. The sequence generator and the combinatorial logic circuit 411 generate control signals required to start play of the master tape in deck I. The audio output of the master tape of deck I passes from the audio input/output circuit 203 of the tape system of FIG. 2 to audio circuit 416 of FIG. 4. The output of the audio circuit 416 is, in turn, connected to the input of the tone decoder 417. As shown in FIG. 9, the first decision after the start of play of deck I is the recognition of Tone #1 on the left channel of the master tape. The appearance of Tone #1 signifies the beginning of a cue statement. The next decision in the flow of FIG. 9 is whether the system is being operated with switch 504 in the record cue or skip cue position. If the option to record the cue is selected, the master sequence generator will generate signals to initiate "dub normal" with the left channel muted. This results in copying the cue from the right channel of the master tape in deck I to the right channel of the trainee tape in deck II and the left channel of the trainee tape is blank. The trainee hears the cue statement as it is recorded. This is illustrated in the format of the trainee tape in FIG. 7. In the event that the option to skip cue is elected the dub norm function is omitted. The end of the presence of tone #1 on the left channel of the tape in deck I signifies the end of the cue statement. When the end of the cue tone is detected, an output signal of the tone decoder 417 is transmitted to the input of the training sequence circuit 412. Output signals of the training sequence circuit 412, like the outputs of the master sequence generator provide input signals to the combinatorial logic array 411. The combinatorial logic circuit generates signals to: stop motion of the transport of deck I, place deck II in the record state; and start monitoring of trainee voice activity and "react time" timeout. The tone decoder 417 includes circuitry for detecting the presence and absence of audio signals from cable 404 which communicates with the headset jacks 507. The react time timeout is performed by the response time circuit 413 which generates an output signal in the event that the react time established by the setting of switch 506 expires before the occurrence of the trainee's voice response. An output of the tone decoder 417, which is connected to the input of the response timing circuit 413, signifies the beginning of a trainee's response and serves to disable react time timeout.

The tone decoder circuit 417 generates voice activity output signals which denote the presence and absence of voice activity of the trainee. The first pause in the voice activity of the trainee initiates pause time timeout and renewal of voice activity resets the pause time timer in the response timing circuit 413. If the trainee responds within the prescribed react time and if the pauses in the trainee's response do not exceed the pause time period, the system will not advance to present the next cue to the trainee. In FIG. 7, the response to cue 1 comprises two segments labeled 1/1 and 2/1 meaning the first and the second voice activity after the end of a cue. In this illustrative example, the trainee initiated the response before the end of react time timeout and completed the response with one pause which is shorter than the pause time timeout. The pause at the end of a trainee's response which exceeds the pause time timeout serves to advance the system to activate the playing of deck I to present the succeeding cue statement.

In the example of FIG. 7, the trainee fails to respond to cue k, react time timeout occurs, and the system advances to present cue n.

The flow of activity in the implementation of react time and pause time timeout is illustrated in FIG. 9. As indicated earlier herein, immediately after detection of the end of the tone #1 recording associated with a cue statement, the control system stops deck I; starts deck II; and places deck II in the record condition. As seen in FIG. 9, if trainee voice activity is detected, react time timing is ended and the process advances to pause time timeout. Trainee voice activity during the countdown resets the pause time timeout timer and the absence of voice activity at the end of a countdown allows the pause time timeout to occur. At that time deck II transport is stopped and the flow chart is re-entered to initiate play of deck I and presentation of the next cue statement. If the end of the tape is detected, signified by the presence of tone #3 on the left channel of the tape in deck I, the system will rewind the tape in deck I and terminate the process.

As indicated earlier herein, a master tape may contain one or more sets of cue statements with or without corresponding lectures. The location of the beginning of a set of cue statements is discretely indicated by the presence of a 4 second blank period on the right channel of the tape in deck I. The program search facility of the normal tape system control logic 206 is arranged to detect such blank periods. The course repeat logic 414, along with the program search facility permits a trainee to repeat a selected set of cues without having to repeat the entire tape sequence. For example, if the tape in deck I contains three sets of cues, the trainee may choose to re-start from any one of the three sets e.g., the second set of the three. The protocol for repeating a set of cues requires the trainee to depress the B switch 502 a number of times equal to the position of the set to be searched for from the current tape position in the sequence of sets. In the example, to repeat the second set of cues while the tape is positioned within the third set, the trainee depresses switch B twice during repeat. Depression of switch B serves to increment a program counter in the course repeat logic 206. As seen in FIG. 9, detection of operation of switch. B during rewind serves to increment the program counter. If no depression of switch B is detected during rewind, the tape will rewind fully. However, if one or more depressions of switch B are detected during rewind, the tape will be rewound to the beginning of a set of cues defined by the number of times the B switch is depressed during rewind. In the example, a single depression of Switch B during rewind will cause the tape to rewind to the beginning of the third set of three sets of cues.

The invention has been described with particular attention to its preferred embodiment; however, it should be understood that variations and modifications within the spirit and scope of the invention may occur to those skilled in the art to which the invention pertains.

What is claimed is:

1. An adjustable interactive audio training system having a plurality of operating modes comprising:

a two deck, stereo recording playback tape module;

manual control means for selecting an operating mode from the plurality of system operating modes; said modes comprising at least a master tape mode and a training mode;

means operable in said master tape mode for preparing master tapes in the second deck of said two deck tape module; said master tapes comprising audio training and control information on a first channel of said tape and comprising coded control information on the second channel of said tape in parallel relation with said audio training information;

said audio training information comprises at least one set of training statements comprising a plurality of cues recorded on said first channel in sequence in corresponding cue segments of said tape; and said coded control information comprises: a first discrete cue control signal recorded on said second channel in parallel with each cue segment, said cue control signals originating in time a first fixed period of time before the beginning of the corresponding cue segment on said first channel and terminating at the end of the corresponding cue segment; a fixed length blank system control signal on both channels preceding the beginning of the cue control signal associated with the first cue segment of each set of training statements; and a second discrete control signal following the cue control signal associated with the last cue of the training information;

means operable in said training mode for playing said master tapes in the first deck to present said audio training information to a trainee;

means for recording audio responses of a trainee to said training information on a training tape in said second deck;

independent operator controlled adjustable react time means for defining a react time timeout period of time;

means for measuring the passage of time after the completion of a cue segment; and timeout means for presenting the next succeeding cue statement in the event that a trainee response is not initiated before the end of said react time timeout period;

independent operator controlled adjustable pause time means for defining a pause time timeout period of time;

means for measuring the time duration of pauses in a trainee's response to a cue; and timeout means for presenting the next succeeding cue statement in the event that the time duration of a pause in the trainee's response is greater than said pause time timeout period.

2. An adjustable interactive audio training system comprising:

a two deck, stereo recording playback tape module;

manual control means;

a master tape comprising audio training and control information on a first channel of said tape and comprising coded control information on the second channel of said tape in parallel relation with said audio training information;

said audio training information comprises at least one set of training statements comprising a plurality of cues recorded on said first channel in sequence in corresponding cue segments of said tape; and said coded control information comprises: a first discrete cue control signal recorded on said second channel in parallel with each cue segment, said cue control signals originating in time a first fixed period of time before the corresponding cue segment on said first channel and terminating at the end of the corresponding cue segment; a fixed length blank system control signal on both channels preceding the beginning of the cue control signal associated with the first cue segment of each set of training statements; and a second discrete control signal following in sequence the cue control signal associated with the last cue of the training information;

means responsive to said manual control means for playing said master tape in the first deck to present said audio training information to a trainee; and means for recording audio responses of a trainee to said training information on a training tape in the second deck;

independent operator controlled adjustable react time means for defining a react time timeout period of time;

means for measuring the passage of time after the end of a cue segment; and timeout means for presenting the next succeeding cue statement in the event that a trainee response is not initiated before the end of said react time timeout period;

independent operator controlled adjustable pause time means for defining a pause time timeout period of time;

means for measuring the time duration of pauses in a trainee's response to a cue; and timeout means for presenting the next succeeding cue statement in the event that the time duration of a pause in the trainee's response is greater than said pause time timeout period.

3. An adjustable interactive audio training system in accordance with claim 1 or claim 2 wherein:

said means for playing said master tapes presents the first cue of said set at a set time in the playback of said tape; and presents the other s of said cues essentially immediately after the completion of the trainee's audio response to the immediately preceding cue; and wherein said means for recording, records said audio responses on a first track of said training tape; and react time and pause time timing information on the second track of said training tape.

4. An adjustable interactive audio training system in accordance with claim 1 or claim 2 wherein:

said training information further comprises: a preamble statement preceding a set of training cues and said fixed length blank period of time associated with said set of training statements on said first channel.

5. An adjustable interactive audio training system in accordance with claim 1 or claim 2 wherein:

said training information comprises a plurality of sets of cues; and said coded control information comprises: a fixed length blank period of time preceding the recording of the cue control signal of the first cue of each of said plurality of sets of cues.

6. An adjustable interactive audio training system in accordance with claim 1 or 2 wherein:

said system further comprises:

instructor means comprising: means for monitoring a training session; means for interrupting a training session and for establishing two way audio communication between an instructor and a trainee.

* * * * *